US012645730B2

US 12,645,730 B2

(12) United States Patent
Gupta et al.

(10) Patent No.: US 12,645,730 B2
(45) Date of Patent: Jun. 2, 2026

(54) GENERATION AND IMPLEMENTATION OF GEOSPATIAL WORKFLOWS

(71) Applicant: X Development LLC, Mountain View, CA (US)

(72) Inventors: Ananya Gupta, Sunnyvale, CA (US); Gearoid Murphy, San Jose, CA (US); Artem Goncharuk, Mountain View, CA (US); Akshina Gupta, Mountain View, CA (US); Haoyu Zhang, Mountain View, CA (US); Adrian Walker, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/816,539

(22) Filed: Aug. 27, 2024

(65) Prior Publication Data

US 2025/0077566 A1 Mar. 6, 2025

Related U.S. Application Data

(60) Provisional application No. 63/534,998, filed on Aug. 28, 2023.

(51) Int. Cl.
*G06F 40/284* (2020.01)
*G06F 16/387* (2019.01)

(52) U.S. Cl.
CPC .......... *G06F 16/387* (2019.01); *G06F 40/284* (2020.01)

(58) Field of Classification Search
None
See application file for complete search history.

(56) References Cited

U.S. PATENT DOCUMENTS

| | | | |
|---|---|---|---|
| 11,769,017 B1 * | 9/2023 | Gray | G06F 40/56 |
| | | | 704/9 |
| 2015/0170386 A1 * | 6/2015 | Chawathe | G06T 1/20 |
| | | | 345/619 |
| 2022/0011400 A1 * | 1/2022 | Ossowski | G01S 5/22 |

OTHER PUBLICATIONS

Setlur, V. et al., "OLIO: A Semantic Search Interference for Data Repositories"; arXiv.org, Cornell University; arXiv:2307.16396; 16 pages; dated Jul. 31, 2023.

(Continued)

*Primary Examiner* — Thu N Nguyen
(74) *Attorney, Agent, or Firm* — Gray Ice Higdon

(57) ABSTRACT

Implementations are described herein for automatically generating multimodal geospatial workflows for accomplishing geospatial tasks. In various implementations, a natural language request may be processed based on generative model(s) such as LLM(s) to generate workflow output tokens that identify high-level actions for completing a geospatial task conveyed in the natural language request. First data indicative of the high-level actions may be processed using one or more of the generative models to generate dataset output tokens that identify responsive dataset(s) that likely contain data responsive to the geospatial task. Second data indicative of both the high-level actions and the responsive dataset(s) may be processed based on one or more of the generative models to generate data manipulation output tokens that identify data manipulation instructions for assembling data from the responsive dataset(s) into a response that fulfills the geospatial task.

18 Claims, 5 Drawing Sheets

(56) References Cited

OTHER PUBLICATIONS

Yin, Z. et al., "An NLP-based Question Answering Framework for Spatio-Temporal Analysis and Visualization"; Geoinformatics and Data Analysis, ACM; pp. 61-65; dated Mar. 15, 2019.

European Patent Office; International Search Report and Written Opinion issued in Application No. PCT/US2024/043667; 11 pages; dated Nov. 19, 2024.

Ahn et al., "Do As I Can, Not As I Say: Grounding Language in Robotic Affordances" Everyday Robots. 34 pages.

Suris et al., "ViperGPT: Visual Inference via Python Execution for Reasoning" arXiv:2303.08128v1 [cs.CV] 18 pages, dated Mar. 14, 2023.

* cited by examiner

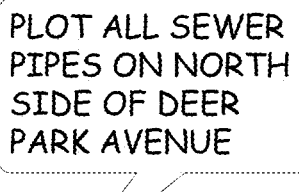
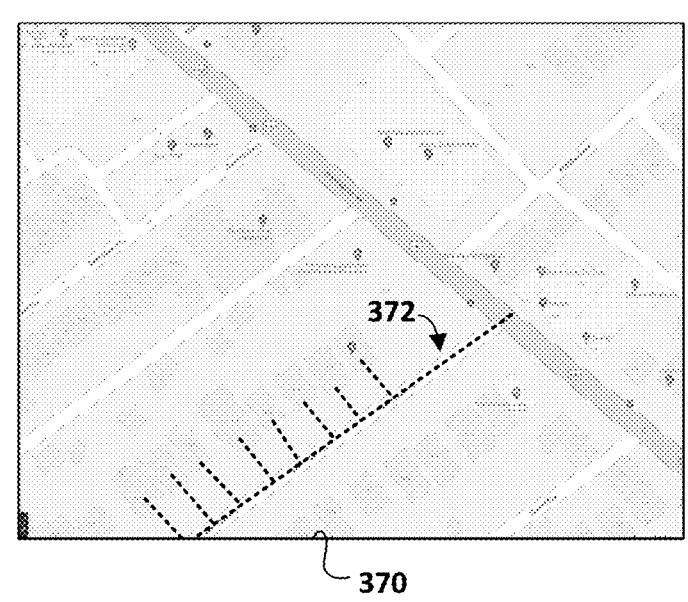
Fig. 3A
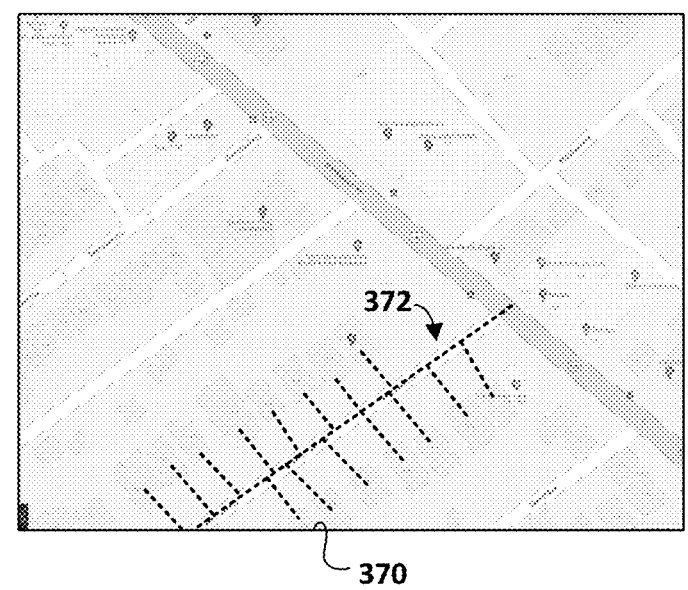
Fig. 3B

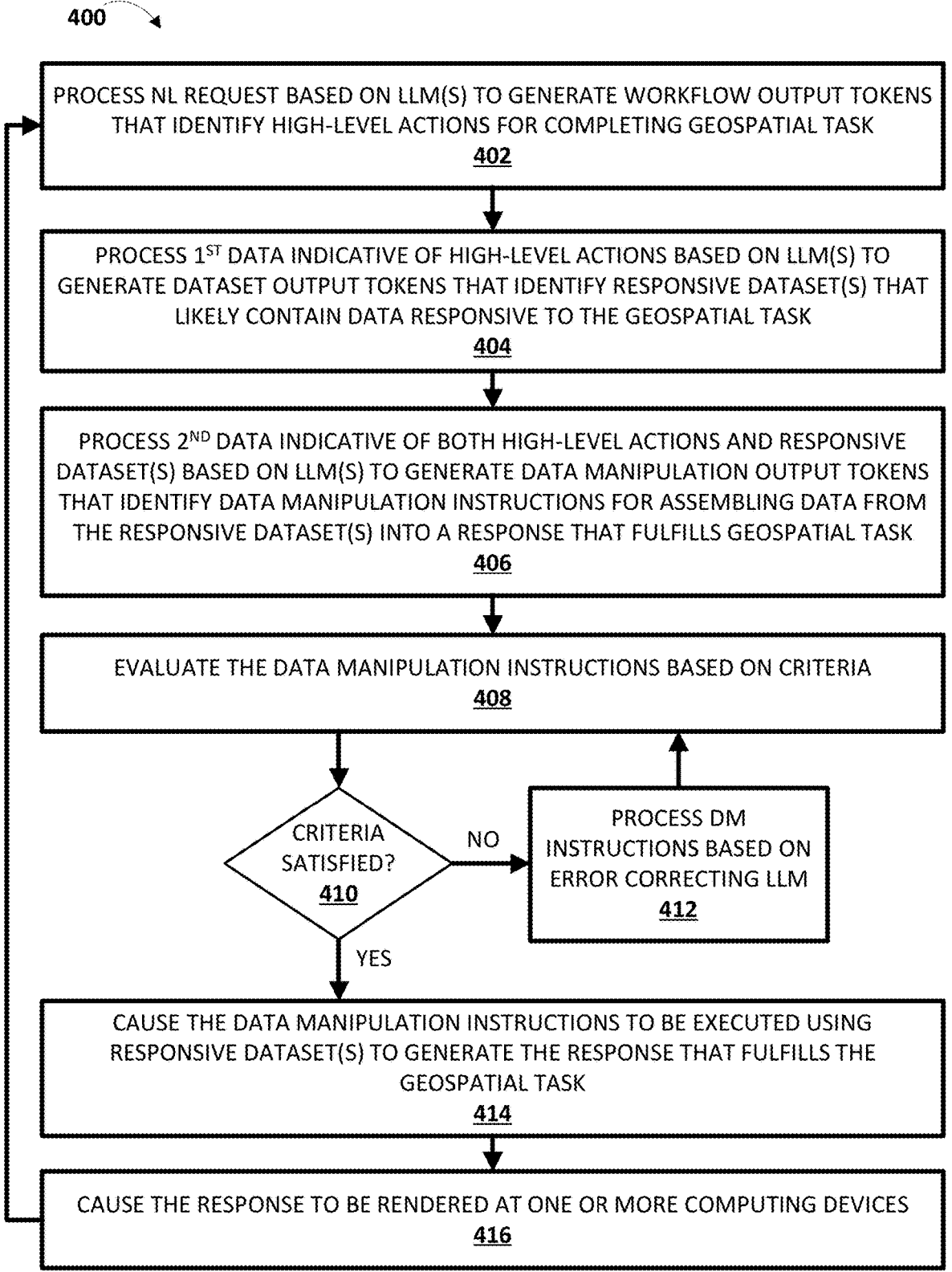

400

PROCESS NL REQUEST BASED ON LLM(S) TO GENERATE WORKFLOW OUTPUT TOKENS
THAT IDENTIFY HIGH-LEVEL ACTIONS FOR COMPLETING GEOSPATIAL TASK
402

PROCESS 1ST DATA INDICATIVE OF HIGH-LEVEL ACTIONS BASED ON LLM(S) TO
GENERATE DATASET OUTPUT TOKENS THAT IDENTIFY RESPONSIVE DATASET(S) THAT
LIKELY CONTAIN DATA RESPONSIVE TO THE GEOSPATIAL TASK
404

PROCESS 2ND DATA INDICATIVE OF BOTH HIGH-LEVEL ACTIONS AND RESPONSIVE
DATASET(S) BASED ON LLM(S) TO GENERATE DATA MANIPULATION OUTPUT TOKENS
THAT IDENTIFY DATA MANIPULATION INSTRUCTIONS FOR ASSEMBLING DATA FROM
THE RESPONSIVE DATASET(S) INTO A RESPONSE THAT FULFILLS GEOSPATIAL TASK
406

EVALUATE THE DATA MANIPULATION INSTRUCTIONS BASED ON CRITERIA
408

CRITERIA
SATISFIED?
410

NO

PROCESS DM
INSTRUCTIONS BASED ON
ERROR CORRECTING LLM
412

YES

CAUSE THE DATA MANIPULATION INSTRUCTIONS TO BE EXECUTED USING
RESPONSIVE DATASET(S) TO GENERATE THE RESPONSE THAT FULFILLS THE
GEOSPATIAL TASK
414

CAUSE THE RESPONSE TO BE RENDERED AT ONE OR MORE COMPUTING DEVICES
416

Fig. 4

GENERATION AND IMPLEMENTATION OF GEOSPATIAL WORKFLOWS

BACKGROUND

Generative models are types of machine learning models—often taking the form of and/or described as large language models (LLMs)—that can perform various tasks, such as language generation, machine translation, and question-answering, to name a few. These generative models are often trained on enormous amounts of diverse data including data from, but not limited to, webpages, electronic books, software code, electronic news articles, and so forth. Accordingly, these generative models leverage the underlying data on which they were trained in performing these various tasks. For instance, in performing a language generation task, generative models such as LLMs can process a natural language (NL) based input that is received from a client device, and generate output in NL or another form that is responsive to the NL based input and that is to be rendered at the client device.

Geospatial datasets such as maps, high-elevation imagery, geographic database(s), etc., may be used in combination with each other to implement what will be referred to herein as "geospatial workflows" to accomplish a variety of different geospatial tasks, such as responding to geospatial queries from users. Data from two or more geospatial datasets can be used to determine, for instance, numbers of features such as trees in a particular geographic region, average tree canopy coverage for playgrounds in regions having different climates, methane leaks having manmade origins (e.g., in urban areas or areas in which oil or gas have been extracted), and real estate pricing trends in areas near large bodies of water, to name a few.

SUMMARY

Designing geospatial workflows can be challenging. A complex geospatial task may require a correspondingly complex geospatial workflow. An expert such as a geospatial data scientist or software engineer may need to spend significant time and resources designing such a complex geospatial workflow. Moreover, a complex geospatial workflow may not necessarily be scalable beyond its original purpose. This is especially true where the geospatial task the workflow is meant to accomplish is narrowly scoped.

Implementations are described herein for automatically generating multimodal geospatial workflows for accomplishing geospatial tasks. More particularly, but not exclusively, implementations are described herein for processing various modalities of data using sequences of generative models (e.g., LLMs) to identify: (i) a geospatial task (e.g., from a natural language request); (ii) high-level actions needed to accomplish the geospatial task; (iii) dataset(s) that contain data responsive to the geospatial task; and (iv) data manipulation instructions for assembling data from the responsive dataset(s) into responsive data that fulfills the geospatial task. Once the data manipulation instructions are assembled, they may be executed to generate the responsive data, which in turn may be rendered at one or more output devices.

In various implementations, a method may be implemented using one or more processors and may include: processing a natural language request based on one or more generative models, such as one or more single modal or multimodal large language models (LLMs), to generate workflow output tokens that identify high-level actions for completing a geospatial task conveyed in the natural language request; processing first data indicative of the high-level actions for completing the geospatial task based on one or more of the generative models to generate dataset output tokens that identify one or more responsive datasets that likely contain data responsive to the geospatial task conveyed in the natural language request; processing second data indicative of both the high-level actions for completing the geospatial task and the one or more responsive datasets based on one or more of the generative models to generate data manipulation output tokens that identify data manipulation instructions for assembling data from the one or more responsive datasets into a response that fulfills the geospatial task; causing the data manipulation instructions to be executed using the one or more responsive datasets to generate the response that fulfills the geospatial task; and causing the response that fulfills the geospatial task to be rendered at one or more computing devices.

In various implementations, the natural language request may be processed based on a different generative model than the first data. In various implementations, the natural language request may be processed based on a different generative model than the second data. In various implementations, the first data is processed based on a different generative model than the second data.

In various implementations, the first data includes metadata about a plurality of candidate datasets from which the one or more responsive datasets are identified. In various implementations, the metadata may include human-curated content describing one or more of the candidate datasets. In various implementations, the metadata may include data indicative of a database schema of one or more of the candidate datasets.

In various implementations, the dataset output tokens may indicate, for a plurality candidate datasets from which the one or more responsive datasets are identified, respective measures of usefulness for performing the high-level actions for completing the geospatial task conveyed in the natural language request.

In various implementations, the one or more responsive datasets may include a first overhead digital depiction of a geographic area that includes annotations identifying land-based features of the geographic area. In various implementations, the first overhead digital depiction may include a raster image. In various implementations, the raster image may be captured by a satellite or an unmanned aerial vehicle (UAV).

In various implementations, the first overhead digital depiction may include a vector-based map of the geographic area. In various implementations, the one or more responsive datasets may include a second overhead digital depiction of at least part of the geographic area. In various implementations, the data manipulation instructions may include instructions to join the first and second overhead digital depictions. In various implementations, the data manipulation instructions may include instructions to overlay one of the first and second overhead digital depictions in relation to the other.

In various implementations, the data manipulation instructions may include source code composed in a high-level programming language. In various implementations, the source code may be configured to be executed to obtain data from the one or more responsive datasets and assemble the response to the natural language request.

In various implementations, the one or more responsive datasets may include at least first and second responsive databases. In various implementations, the data manipulation instructions may include instructions to join data from first and second responsive databases. In various implementations, the instructions to join data from the first and second responsive databases may include structured query language (SQL) instructions. In various implementations, the instructions to join data from the first and second responsive databases may include source code composed in a high-level programming language.

In various implementations, the method may further include: evaluating the data manipulation instructions based on one or more criteria; based on a determination that the data manipulation instructions fail to satisfy one or more of the criteria, assembling an input prompt for one or more of the generative models, wherein the input prompt comprises at least some of the data manipulation instructions and additional information about the determination that the data manipulation instructions fail to satisfy one or more of the criteria; and processing the input prompt using one or more of the generative models to generate new data manipulation instructions. In various implementations, the data manipulation instructions may include source code in a high-level programming language, and the one or more criteria may include a capability of compiling the source code without error.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A and FIG. 3B schematically depict example scenarios in which selected aspects of the present disclosure may be implemented.

FIG. 4 depicts a flowchart illustrating an example method of practicing selected aspects of the present disclosure, in accordance with various implementations.

DETAILED DESCRIPTION

Figure 1:
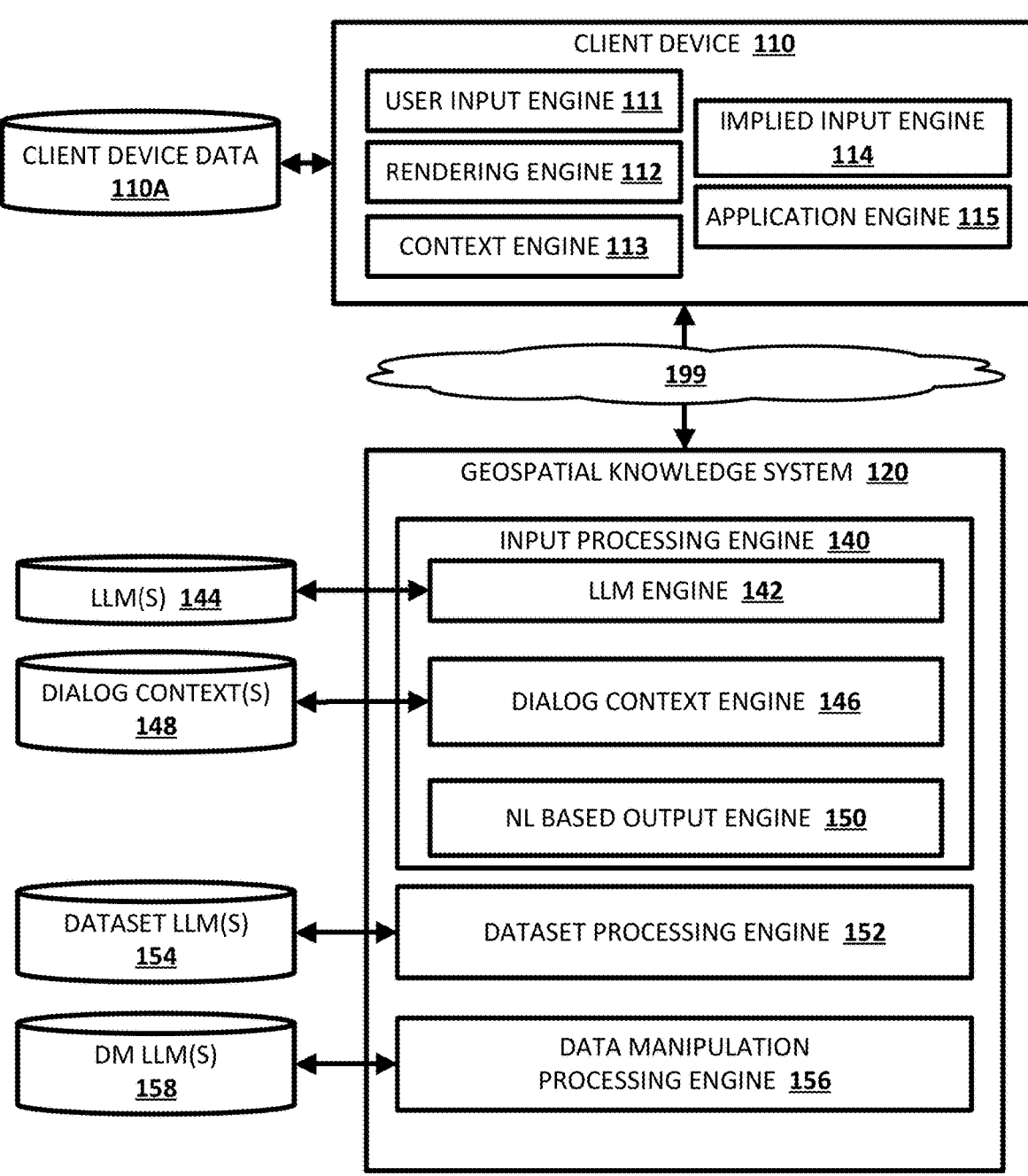
FIG. 1 depicts a block diagram of an example environment that demonstrates various aspects of the present disclosure, and in which some implementations disclosed herein can be implemented.

Designing geospatial workflows can be challenging. A complex geospatial task may require a correspondingly complex geospatial workflow. An expert such as a geospatial data scientist or software engineer may need to spend significant time and resources designing such a complex geospatial workflow. Moreover, a complex geospatial workflow may not necessarily be scalable beyond its original purpose. This is especially true where the geospatial task the workflow is meant to accomplish is narrowly scoped.

Implementations are described herein for automatically generating multimodal geospatial workflows for accomplishing geospatial tasks. More particularly, but not exclusively, implementations are described herein for processing various modalities of data using sequences of generative models (e.g., LLMs) to identify: (i) a geospatial task (e.g., from a natural language request); (ii) high-level actions needed to accomplish the geospatial task; (iii) dataset(s) that contain data responsive to the geospatial task; and (iv) data manipulation instructions for assembling data from the responsive dataset(s) into responsive data that fulfills the geospatial task. Once the data manipulation instructions are assembled, they may be executed to generate the responsive data, which in turn may be rendered at one or more output devices.

In some implementations, based on the responsive data, a user may issue follow up requests, e.g., as part of a human-to-computer dialog with a chatbot or virtual assistant configured with selected aspects of the present disclosure. Data from one dialog turn may be reused during subsequent dialog turns so that the user can iteratively and/or progressively fulfill and/or refine a geospatial task, e.g., using trial and error to converge on the solution they seek.

In various implementations, a user that wishes to accomplish a geospatial task may utter or type a natural language request that conveys the geospatial task. This natural language request may be processed, e.g., as a sequence of tokens using a generative model such as a "workflow LLM," to generate "workflow output tokens." In some implementations, the workflow LLM may be trained to generate, based on a natural language request, output tokens that convey, correspond to, or otherwise identify, directly or indirectly, high-level actions for completing a geospatial task corresponding to the geospatial query.

Suppose a user utters or types the natural language query, "I want a count of trees in Cherokee Park in Louisville, Kentucky." When processed using the workflow LLM, the workflow LLM may generate workflow output tokens that convey one or more workflows, which if there are multiple workflows generated, each may be considered a "candidate workflow." Each workflow may include a sequence of high-level actions that if performed, will cause responsive data that fulfills the user's request to be generated. The working example about trees in Cherokee Park might generate, as alternatives to each other, the following candidate workflows:

| Candidate workflow A | Candidate workflow B |
|---|---|
| 1. Identify database that has tree inventory of Cherokee Park | 1. Search for satellite imagery of Cherokee Park |
| 2. Generate SQL query that requests a number of trees in Cherokee Park | 2. Run computer vision (CV) model on responsive satellite imagery to annotate instances of detected trees |
| 3. Submit SQL query to identified database | 3. Count annotations across all satellite imagery of Cherokee Park |

In some implementations, as the geospatial workflow generation process described herein progresses, these candidate workflows may be evaluated, e.g., against each other, and the most "suitable" or best candidate workflow may be selected for implementation.

In some implementations, the workflow LLM may also be conditioned to ground actions of a candidate workflow to a context of the user. A user's context may include, for instance, metadata about an ecosystem of datasets and/or application programming interfaces (APIs) that are at the user's disposal. This contextual data may be used to condition the workflow LLM, e.g., along with the natural language request. As a result, the workflow LLM may generate output tokens representing proposed workflows and constituent workflow actions that are appropriate both semantically and contextually.

In some implementations, once the workflow(s) are identified from the output tokens, data indicative of the workflow(s), such as the workflow output tokens of the workflow LLM directly, embedding(s) generated therefrom, etc., may be processed using the same workflow LLM or a different generative model. In the latter case, the different generative model may, in some instances, be a "dataset LLM" (or more generally, a "dataset generative model") that is trained to identify suitable dataset(s) for accomplishing geospatial tasks. In some such implementations, data indicative of the workflow(s) and data indicative of candidate datasets (e.g., dataset metadata) may be used to assemble a prompt for the dataset LLM. The dataset LLM may then generate "dataset output tokens" that identify one or more responsive datasets that likely contain data responsive and/or relevant to the geospatial task.

In the "candidate workflow B" above, various datasets, such as web pages, general image repositories, databases, maps, repositories of high-elevation imagery, etc., may be evaluated to determine whether they are likely to contain data responsive to or otherwise relevant to fulfilling the geospatial task. In some implementations, metadata about these datasets may be used to condition the dataset LLM, e.g., along with the workflow actions, to assign a score to each dataset or to simply classify the dataset as suitable or not. These metadata may include, for instance, human-composed descriptions of the datasets, schemas where the datasets are structured data, reduced dimensionality embeddings that represent the semantics of the datasets, and so forth. The dataset output tokens generated based on the dataset LLM may identify satellite imagery and/or aerial imagery as likely to contain data that is usable to count trees in Cherokee Park.

In some implementations, generative models other than LLMs may be used to implement various aspects of the present disclosure. For instance, a dataset generative model may take the form of a vision language model (VLM) that is similar to an LLM except that it can accept other modalities of input besides text, such as images or embeddings generated based on images. Such a dataset VLM may be used to query images for content that is potentially responsive or relevant to a geospatial task. For instance, if a workflow seeks information about rivers, then a VLM may be used to identify, as responsive datasets, satellite and/or aerial imagery that depicts rivers, and to exclude satellite and/or aerial imagery that does not depict rivers.

One responsive dataset(s) are selected, in some implementations, one or more LLMs may be prompted with data indicative of the responsive dataset(s), such as metadata, tokens indicative of dataset metadata, date within the dataset(s), etc. For example, a "data manipulation LLM" (or more generally, a "data manipulation generative model") may be prompted with dataset tokens corresponding to satellite imagery and/or aerial imagery, in combination with tokens representing workflow action(s). "Data manipulation tokens" generated by the data manipulation LLM based on this prompt may identify, directly or indirectly, "data manipulation instructions" for assembling (e.g., joining) data from the one or more responsive datasets into a response that fulfills the natural language request. In the Cherokee Park example, the data manipulation instructions may cause computer vision technique(s) to be performed to detect trees in the satellite and/or aerial imagery, e.g., by adding bounding boxes or other annotations to detected trees, and counting the annotations.

Data manipulation instructions may take various forms. In some implementations, data manipulation instructions may take the form of source code composed in a high-level programming language such as C, C++, Python, Java, Perl, etc. In other implementations, the data manipulation instructions may be composed using various types of syntactically constrained pseudocode (which in turn can be translated into high-level programming languages for downstream execution). Whichever language is used, the source code may be configured to be executed to obtain data from the one or more responsive datasets and assemble a response that fulfills the geospatial task. In other implementations, the data manipulation instructions may be composed in a domain specific language (DSL) that is executable in a particular domain, such as a software application that has a built-in scripting language, or that is capable of receiving mathematical commands that accept data from the responsive datasets as parameters. If the responsive dataset(s) include a database having a defined schema, the data manipulation instructions may include, for instance, a structured query language (SQL) command.

The data manipulation instructions may then be performed (e.g., executed) using responsive dataset(s) to generate a response that fulfills the geospatial task. The response may take various forms depending on factors such as the modality in which the request was made, a requested modality, available output devices and/or applications, and so forth. In the Cherokee Park example, the response may be a natural language response such as "According to the satellite imagery I have available, Cherokee Park has approximately 235,000 trees." Other geospatial tasks may call for other types of responses, such as charts, statistics, reports, heatmaps, vector visualizations (e.g., visual annotations) on maps, and so forth.

Turning now to FIG. 1, a block diagram of an example environment that demonstrates various aspects of the present disclosure, and in which implementations disclosed herein can be implemented, is depicted. The example environment includes a client device 110 and a geospatial knowledge system 120, which is depicted separately in FIG. 1. In some implementations, all or aspects of the geospatial knowledge system 120 can be implemented locally at the client device 110. In additional or alternative implementations, all or aspects of the geospatial knowledge system 120 can be implemented remotely from the client device 110 as depicted in FIG. 1 (e.g., at remote server(s)). In those implementations, the client device 110 and the geospatial knowledge system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which input can be submitted and/or output that is responsive to the input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the geospatial knowledge system 120.

For instance, in some implementations, a mapping application (which may be a standalone application or may be operated in a web browser) may include a chat interface that allows a user to engage with a human-to-computer dialog with an automated assistant. In various implementations, the automated assistant provided via such a mapping application may be tailored to the mapping application, or may be a general purpose automated assistant that is capable of operating in the mapping application's domain (e.g., via an API of the mapping application). During such a human-to-computer dialog, the user may provide input(s) that enable the automated assistant to orchestrate various aspects of the present disclosure to automatically create and implement geospatial workflows. Such a human-to-computer dialog may include multiple turns of dialog in some instances. For example, a first geospatial workflow that is generated in response to a first NL input may not operate properly (e.g., may crash or produce incorrect information). In such a case, the user may be prompted to provide additional information and/or feedback that enables additional attempts at building the geospatial workflow properly during subsequent turns of the human-to-computer dialog.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to digital images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of an input described herein can be a query for a geospatial workflow that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), an image or video query that is based on vision data captured by vision component(s) of the client device 110 (or based on NL input generated based on processing the image using, for example, object detection model(s), captioning model(s), etc.), or any combination thereof. Other instances of a NL based input described herein can be a prompt for geospatial content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render responsive content (e.g., NL based output, geospatial workflow output, an indication of source(s) (e.g., dataset(s)) associated with the geospatial workflow output, and/or other content) for audible and/or visual presentation to a user of the client device 110 using one or more user interface output devices. For example, the client device 110 can be equipped with one or more speakers that enable the responsive content to be provided for audible presentation to the user via the client device 110. Additionally, or alternatively, the client device 110 can be equipped with a display or projector that enables the responsive content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

In some implementations, client device database 110A may include information such as metadata about datasets that are available to client device 110 and/or to a user of client device 110. A dataset may be any structured or unstructured source of data, particularly geospatial data, that can be accessed to implement geospatial workflows as described herein. In various implementations, a dataset may take the form of, for instance, an API that is accessible to retrieve or otherwise interact with geospatial data, a structured database (e.g., accessible using SQL), vector or raster image files such as vectorized interactive maps, digital images, videos, satellite images, or aerial images, spreadsheets, free-form documents such as articles, reports, papers, and so forth. A user may have access to a dataset by virtue of that dataset being stored locally in client device database 110A, or by virtue of that dataset being accessible at another remote computing device/system (e.g., the cloud) using data stored in client device database 110A. In some implementations, a user may be "subscribed" or otherwise authorized to access particular datasets, e.g., via an API or other interface. Such a subscription may be provided to the user in various scenarios, such as part of the user's employment or enrollment at a university or other research institute, as an on demand (e.g., paid) service, via a government agency, and so forth.

In various implementations, the context engine 113 can determine a current context based on a current state of a dialog session (e.g., considering one or more recent inputs provided by a user or outputs provided to the user during the human-to-computer dialog session), profile data, and/or a current location of the client device 110. For instance, the context engine 113 can determine a current context of "arborist seeking a count of trees in Cherokee Park in Louisville, Kentucky" based on a recently issued query, profile data, and an anticipated future location of the client device 110 (e.g., based on recently booked hotel accommodations in Louisville). As another example, the context engine 113 can determine a current context based on which software application is active in the foreground of the client device 110, a current or recent state of the active software application, and/or content currently or recently rendered by the active software application. As yet another example, the context engine 113 can determine a current context based on which dataset(s) are available in or via client device database 110A.

A context determined by the context engine 113 can be utilized, for example, in supplementing or rewriting NL based input (or any type of input) that is formulated based on user input, in generating an intermediate input (e.g., an implicit query or prompt formulated independent of any explicit NL based input provided by a user of the client device 110), and/or in determining to submit an intermediate input and/or to render result(s) (e.g., a geospatial workflow output) for an implicit NL based input. In some implementations, a context determined by the context engine 113 can be utilized in selecting one or more relevant or applicable datasets from the datasets that are available in or via client device database 110A. As will be described below, these datasets may be evaluated to determine which contain geospatial data that is potentially responsive or otherwise relevant to a user's query.

In various implementations, the client device 110 can include an implied input engine 114 that is configured to generate an intermediate input independent of any user explicit NL based input provided by a user of the client device 110. The implied input engine 114 may also be configured to submit an intermediate input, optionally independent of any user explicit NL based input that requests submission of the intermediate input; and/or cause rendering of search result(s) or a NL based output for the intermediate input, optionally independent of any explicit NL based input that requests rendering of the search result(s) or the NL based output. For example, the implied input engine 114 can use one or more past or current contexts, obtained from the context engine 113, in generating an intermediate input, determining where to submit the intermediate input (e.g., to an LLM engine 142), and/or in determining to cause rendering of a NL based output that is responsive to the intermediate input.

Further, the client device 110 and/or the geospatial knowledge system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The geospatial knowledge system 120 is illustrated in FIG. 1 as including an input processing engine 140, a dataset processing engine 152, and data manipulation processing engine 156. Some of these engines can be combined and/or omitted in various implementations. Further, these engines can include various sub-engines. For instance, the input processing engine 140 is illustrated in FIG. 1 as including a LLM engine 142, a dialog context engine 146, and a NL based output engine 150. Similarly, some of these sub-engines can be combined and/or omitted in various implementations. Accordingly, it should be understood that the various engines and sub-engines of the geospatial knowledge system 120 illustrated in FIG. 1 are depicted for the sake of describing certain functionalities and are not meant to be limiting.

Further, the geospatial knowledge system 120 is illustrated in FIG. 1 as interfacing with various databases, such as LLM(s) database 144, dialog context(s) database 148, dataset LLM(s) database 154, and data manipulation (DM) LLM(s) database 158. Although particular engines and/or sub-engines are depicted as having access to particular databases, it should be understood that is for the sake of example and is not meant to be limiting. For instance, in some implementations, each of the various engines and/or sub-engines of the geospatial knowledge system 120 may have access to each of the various databases. Further, some of these databases can be combined and/or omitted in various implementations. Accordingly, it should be understood that the various databases interfacing with the geospatial knowledge system 120 illustrated in FIG. 1 are depicted for the sake of describing certain data that is accessible to the geospatial knowledge system 120 and is not meant to be limiting.

In various implementations, geospatial knowledge system 120 can cause the LLM engine 142 to process, using a generative model such as an LLM stored in the LLM(s) database 144, NL based input to generate a stream of LLM output. The stream of LLM output may be provided by NL based output engine 150 (which may be configured to cause the stream of LLM output to be rendered at client device 110) and/or may be used to prompt the same LLM or different LLM(s) to generate additional information. An LLM (or more generally, a generative model) contained in any of databases 144, 154, and 158 can include model(s) such as PaLM, BERT, LaMDA, Meena, and/or any other generative model, such as any other generative model that is encoder-only based, decoder-only based, sequence-to-sequence based and that optionally includes an attention mechanism or other memory, diffusion model(s), etc. Generative models may have hundreds of millions, or even hundreds of billions of parameters. In some implementations, generative models may include multi-modal models such as a VLM and/or a visual question answering (VQA) model, which can have any of the aforementioned architectures, and which can be used to process multiple modalities of data, particularly images and text, and/or images and audio for example, to generate one or more modalities of output. Non-limiting examples of VLMs that may be applied as described herein include Gemini and/or Flamingo, to name a few.

The stream of LLM output can include, for example, a probability distribution over a sequence of tokens, such as words, phrases, or other semantic units, which are predicted to be responsive to LLM input. Notably, any generative model described herein can include billions of weights and/or parameters that are learned through training the generative model on enormous amounts of diverse data. This enables the generative model to generate output as the probability distribution over the sequence of tokens. In various implementations, geospatial knowledge system 120 may cause dialog context engine 146 to manage dialog contexts based on data stored in dialog context database 148, that can be accomplished based on geospatial data. "Geospatial data" may include any data that has a geographic component, such as raster or vector maps, satellite or aerial imagery, databases storing geospatial content, articles, books, reports, charts, etc.

As a non limiting example, a user of client device 110 may engage in a human-to-computer dialog with an automated assistant that is incorporated into a mapping application. Suppose the user is operating the mapping application to view a map of a particular city or neighborhood. The user may invoke the automated assistant, e.g., with one or more wake words or by activating an invocation input, and may provide a geospatial query such as "plot all sewer lines." This geospatial query may trigger generation and/or implementation of a geospatial workflow that ultimately causes underground sewer lines in the geographic area that is rendered by the user's mapping application to be visually annotated, or "plotted."

In some implementations, one or more LLMs in LLM(s) database 144 may be a "workflow LLM" that is trained to generate, based on geospatial (e.g., NL) request, output tokens that convey, correspond to, or otherwise identify, directly or indirectly, high-level actions for completing a geospatial task corresponding to the geospatial query. One example was described previously with regard to a count of trees in Cherokee Park in Louisville, KY.

As another example, suppose a user utters or types the natural language query, "Show me man made methane leaks" while viewing a map of New Hampshire. When this query, plus applicable contextual data (e.g., the user is currently viewing a map of New Hampshire), is processed using the workflow LLM, the workflow LLM may generate workflow output tokens that convey one or more workflows. If there are multiple workflows generated, each may be considered a "candidate workflow." Each workflow may include a sequence of high-level actions that if performed successfully, will cause responsive data that fulfills the user's request to be generated. In this working example about methane leaks in New Hampshire, the following candidate workflows may be generated as alternatives to each other:

| Candidate workflow A | Candidate workflow B |
|---|---|
| 1. Identify database(s) that have inventories of man made methane leaks in Maine, New Hampshire, Vermont, Massachusetts, and Rhode Island. 2. Generate SQL queries that request a number of manmade methane leaks in identified database(s) 3. Submit SQL queries to identified database(s) | 1. Search for infrared satellite imagery of New Hampshire 2. Search for map that segments between rural and nonrural areas 3. Spatially register infrared satellite imagery with map 4. Run computer vision (CV) model on portion(s) of satellite imagery that are within nonrural areas of map to annotate instances of man made methane leaks 5. Count annotations | including identifying new dialog contexts, shifting between existing dialog contexts, managing the cascade of information (e.g., data indicative of failed or aborted geospatial workflows) across multiple dialog turns, etc.

In some implementations, LLM engine 142 may be configured to process a natural language request received by user input engine 111 of client device 110. The natural language request may convey or otherwise identify a geospatial task. In other implementations, a geospatial task may be received via other means, such as a command from a remote computing system. A geospatial task may be any task In order for geospatial knowledge system 120 to generate geospatial workflows that will provide information responsive to a user's query, geospatial knowledge system 120 may seek out geospatial data that is relevant and/or responsive to the user's query. To this end, geospatial knowledge system 120 may be configured to identify, e.g., using context engine 113, dataset(s) that are (a) available to it and (b) contain potentially responsive geospatial data.

To accomplish this, in some implementations, geospatial knowledge system 120 may cause the dataset processing engine 152 to process, using a dataset LLM stored in the dataset LLM(s) database 154, data indicative of one or more datasets that are available to client device 110 and/or to a user of client device 110. For example, in some implementations, dataset processing engine 152 may be prompted with metadata indicative of one or more available datasets. In some implementations, dataset processing engine 152 may also include, as part of the same input prompt, data indicative of high-level actions for completing a geospatial task conveyed in a natural language request.

In some implementations, once workflow(s) such as those set forth above are identified from workflow output tokens, data indicative of the workflow(s), such as the workflow output tokens directly, embedding(s) generated therefrom, etc., may be processed by dataset processing engine 152 using a dataset LLM stored in dataset LLM(s) database 154. A dataset LLM may be trained to identify suitable dataset(s) for accomplishing geospatial tasks. In some such implementations, data indicative of the workflow(s) and data indicative of candidate datasets (e.g., dataset metadata) may be used to assemble a prompt for the dataset LLM. The dataset LLM may then generate dataset output tokens that identify one or more responsive datasets that likely contain data responsive to the geospatial task.

In the methane leak example, and particularly with regard to the "candidate workflow B", various datasets, such as web pages, general image repositories, databases, maps, repositories of high-elevation imagery, etc., may be evaluated to determine whether they are likely to contain data responsive to or otherwise relevant to fulfilling the geospatial task of identifying and depicting man made methane leaks. In some implementations, metadata about these datasets may be used to condition the dataset LLM, e.g., along with the workflow actions, to assign a score to each dataset or to simply classify the dataset as suitable or not. These metadata may include, for instance, human-composed descriptions of the datasets, schemas where the datasets are structured data, reduced dimensionality embeddings that represent the semantics of the datasets, and so forth. The dataset output tokens generated based on the dataset LLM may identify satellite imagery and/or aerial imagery that includes infrared spectral data as likely to contain data that is useable to detect methane leaks, as well as map(s) that logically and/or visually segment New Hampshire into rural and nonrural areas.

In other implementations, VLMs may be used, e.g., alone or in conjunction with a dataset LLM described previously, to determine whether candidate visual datasets depict or portray data that is likely relevant or responsive to a geospatial task. For example, one or more of the workflow actions may be formulated as a query that is used to assemble an input prompt for a VLM, along with image(s) that are to be queried. The output generated based on the VLM may indicate whether the image(s) contain geospatial features that are relevant to carrying out the geospatial task.

Once responsive dataset(s) are identified by dataset processing engine 152, data manipulation processing engine 156 may use data manipulation LLM(s) stored in data manipulation (DM) LLM(s) database 158 to generate data manipulation output tokens that identify data manipulation instructions for assembling (e.g., joining) data from the or more responsive dataset(s) into a response that fulfills the natural language request and/or geospatial task. Data from different datasets may be joined in various ways. If two or more of the datasets are images (raster or vector, including satellite and/or aerial imagery), then joining data may include spatial registration/alignment, overlaying all or parts of one image over the other (including increasing transparency of one image or the other where necessary), projecting annotations (e.g., of detected objects) from one image onto corresponding geographic locations in the other image, and so forth. If two or more of the datasets are databases, then joining data may include formulating and executing database queries (e.g., in SQL) that join or otherwise extract data as requested or needed.

Data manipulation instructions may take various forms, such as source code composed in a high level programming language, instructions written in a DSL that is embedded in another application, a sequence of operations performed using an application's API, a sequence of input operations performed automatically within an application, and so forth. In the methane leak example, the data manipulation instructions may cause satellite and/or aerial infrared imagery to be registered (e.g., spatially aligned) with the map that segments New Hampshire into rural and nonrural areas. The data manipulation instructions may then detect and visually annotate methane leaks that fall within the nonrural areas. Those visual annotations may be rendered over the map the user was looking at originally.

Once generated, the data manipulation instructions may be executed, e.g., by data manipulation processing engine 156 and/or another component of geospatial knowledge system 120, using the responsive dataset(s) to generate the response that fulfills the geospatial task. In the methane leak example, the response may be, for instance, added annotations of methane leaks rendered on top of the map of New Hampshire the user was already viewing, or a separate map.

Figure 2:
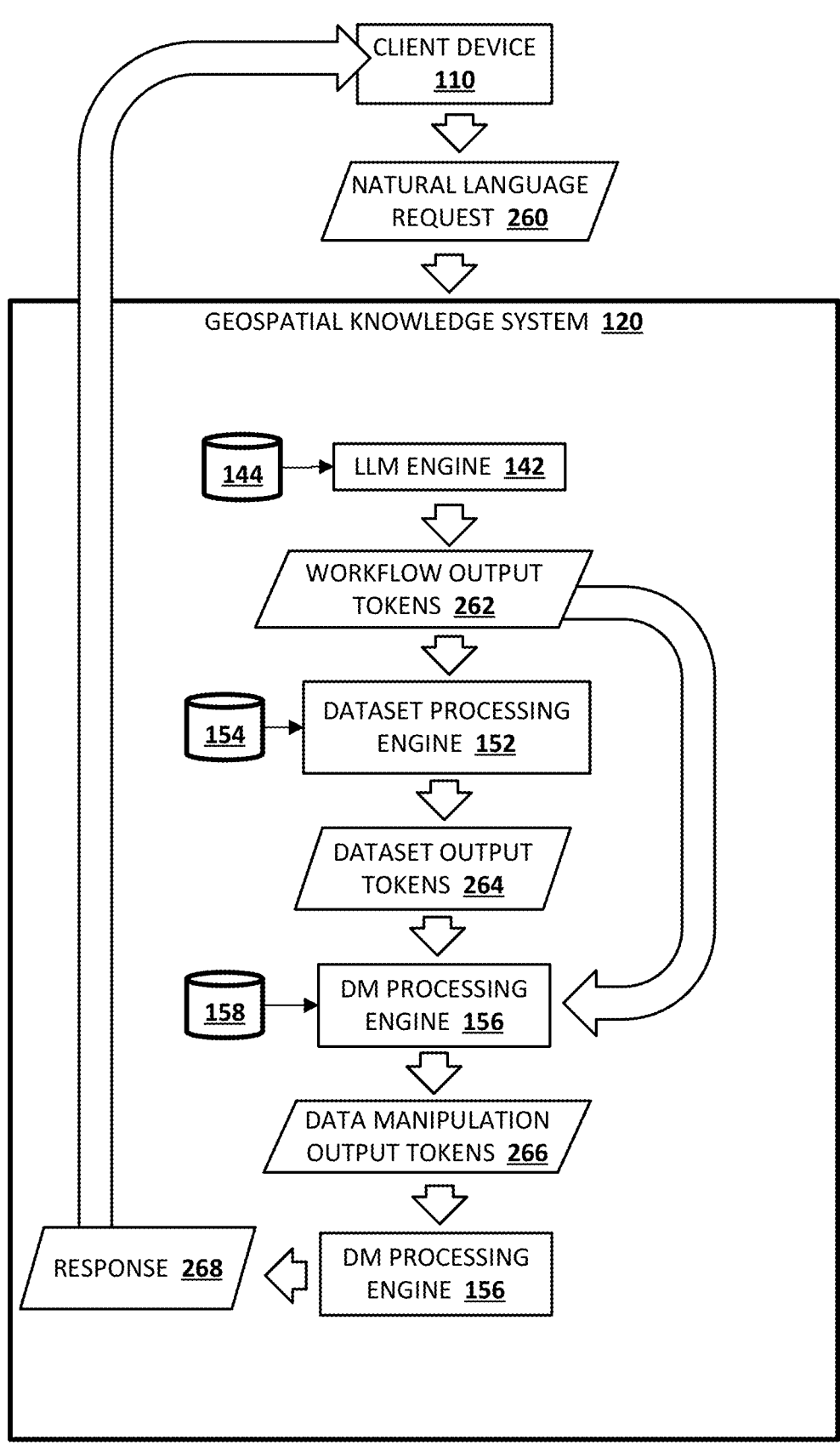
FIG. 2 schematically depicts an example of how various components may exchange data to facilitate multi-modal assistant engagement, in accordance with various implementations.

FIG. 2 schematically depicts an example of how various components of FIG. 1 may cooperate to implement selected aspects of the present disclosure. Starting at top, client device 110 may provide data indicative of a natural language request 260 typed or spoken by a user (not depicted) to geospatial knowledge system 120. In various implementations, the natural language request 260 may convey a geospatial task that the user wishes to accomplish (or at least prepare a workflow to accomplish). In other implementations, other modalities of data may be provided as input(s), such as visual data (e.g., a map a user is viewing, satellite imagery currently viewed by the user).

Geospatial knowledge system 120 may cause LLM engine 142 to process the data indicative of the natural language request 260, e.g., as input tokens for a workflow LLM stored in LLM(s) database 144. The workflow LLM may generate workflow output tokens 262 that identify high-level actions for completing a geospatial task conveyed in the natural language request. In some implementations, these high-level actions may be expressed as natural language.

The workflow output tokens 262 may then be used by dataset processing engine 152 to assemble an input prompt for a dataset LLM stored in dataset LLM(s) database 154. In some implementations, the workflow output tokens 262 may be used directly as input tokens for the dataset LLM. In other implementations, the high-level actions identified from the workflow output tokens 262 may be used. In some implementations, the input prompt for the dataset LLM may also include metadata associated with candidate datasets that are available to the user and/or client device 110.

Dataset processing engine 152 may generate, using the dataset LLM, dataset output tokens 264 that identify one or more responsive datasets that likely contain data responsive to the geospatial task conveyed in the natural language request. For example, the dataset output tokens 264 may identify which of the candidate datasets are likely to contain suitable data for accomplishing the geospatial task. In other implementations, the dataset LLM may be used as a classifier that separately processes metadata for each candidate dataset, and outputs a pass or fail.

The dataset output tokens 264 may be used by DM processing engine 156 to assemble an input prompt for a DM LLM from DM LLM(s) database 158. As shown by the arrow at right, in some implementations, the workflow output tokens (or data indicative thereof) may also be provided to DM processing engine 156 and used to assemble the input prompt for the DM LLM from DM LLM(s) database 158. Using the DM LLM, DM processing engine 156 may generate data manipulation output tokens 266 that identify data manipulation instructions for assembling data from the one or more responsive datasets into a response that fulfills the natural language request 260.

In various implementations, the data manipulation output tokens 266 may then be processed, e.g., by DM processing engine 156 or another component of geospatial knowledge system 120, to generate the response 268 to the natural language request 260. Data indicative of the response 268 may then be provided to client device 110, e.g., so that rendering engine 112 can render appropriate audible or visual output.

In some implementations, DM processing engine 156 may evaluate the data manipulation output tokens 266 to determine whether they satisfy various criteria, e.g., before assembling the response 268 and sending it back to client device 110. For instance, if the data manipulation output tokens 266 include or are indicative of source code in a high level programming language, DM processing engine 156 may attempt to compile the source code. If compiler errors are thrown, DM processing engine 156 may take various remedial actions. In some implementations, the source code and/or compiler errors may be provided as inputs to an error correcting LLM (not depicted), which in turn will generate, as output tokens, new source code. The new source code may once again be evaluated by DM processing engine 156, and the process may repeat until, for instance, no more compiler errors are thrown, or until a maximum number of loops has been reached. If the criteria are satisfied, the response 268 may then be generated and provided to client device 110.

In some implementations, geospatial knowledge system 120 may provide a multi-turn human-to-computer dialog that enables the user to iteratively and/or progressively generate geospatial workflows, refining the workflow at each iteration to achieve the geospatial goal of the user. For instance, the process depicted in FIG. 2 may be performed iteratively to eventually provide a response 268 to the user's natural language request 260. If the user is dissatisfied with response 268, the user may provide, e.g., as spoken or typed natural language, feedback about the response and/or make additional geospatial requests.

In the methane leak example, for instance, the user may be presented with a map having annotations of methane leaks in cities, but not in oil and gas fields because those are considered "rural" in the applicable dataset. However, methane leaks in oil and gas fields may be largely manmade. Accordingly, the user may utter a follow-up natural language request 260 such as "OK, I also need to see methane leaks in oil and gas fields." The process of FIG. 2 may repeat, e.g., with various output tokens (e.g., 262, 264, 266) and/or other data generated during the first iteration being reused during the second iteration. For example, various tokens (e.g., 262, 264, 266) generated during the first iteration may be reused in input prompts that are processed by various LLMs during the second iteration, along with the user's follow-up natural language request.

FIGS. 3A and 3B depict an example of how techniques described herein may be used to accomplish a geospatial task. In this example, it can be assumed that a user (not depicted) operates client device 110 to view a map 370 of a neighborhood. In FIG. 3A, the user issues the natural language request, "plot all sewer pipes on the northside of Deer Park Avenue." This may trigger the workflow depicted in FIG. 2. The user's natural language request may be processed, e.g., by LLM engine 142 using a workflow LLM stored in database 144, to generate workflow output tokens (e.g., 262 in FIG. 2) that identify, as a candidate workflow, a sequence of high-level actions (e.g., expressed in natural language) that can be performed to accomplish the geospatial task conveyed in the user's natural language request, namely, plotting all sewer pipes on the north side of the street called "Deer Park Avenue."

In some cases, multiple candidate workflows may be generated. For instance, a first candidate workflow may be generated that assumes the mapping application operated by the user to view map 370 has access to data about sewer pipes and the functionality to render them over a map. In that case, the first candidate workflow may simply include actions to automatically interact with and/or navigate the graphical user interface (GUI) or API of the mapping application to cause the appropriate sewer pipes to be rendered. A second candidate workflow may be generated that includes actions to locate maps that (a) include sewer data and (b) overlap at least partially with map 370, align those maps spatially, and detect the sewer lines so that annotations indicative of the detected sewer lines can be rendered on map 370.

Data indicative of these high-level actions, such as the workflow output tokens themselves, may then be processed by dataset processing engine 152, e.g., along with metadata associated with candidate dataset(s) that are accessible to the user and/or to client device 110. Based on dataset output tokens (264 in FIG. 2) generated from this additional processing, one or more of the candidate dataset(s) may selected as a responsive dataset containing geospatial data that is potentially responsive to the user's query/geospatial task. In the example of FIG. 3A, for instance, a municipal map of sewer lines in the area currently depicted in map 370 may be selected.

Once responsive dataset(s) are selected, data indicative of the responsive dataset(s) and the workflow(s) may be processed, e.g., by DM processing engine 156, using a DM LLM stored in DM LLM(s) database 158. This additional processing may yield data manipulation output tokens (e.g., 266 in FIG. 2) that identify (directly or indirectly) data manipulation instructions for manipulating data from the responsive dataset(s) to assemble a response (e.g., 268 in FIG. 2) to the user's natural language request. In the example of FIG. 3A, for instance, the response may be map 370 annotated with dashed lines 372 that spatially represent sewer pipes.

As noted elsewhere herein, geospatial knowledge system 120 may in some cases provide a multiturn chatbot-like experience in which a user can iteratively generate and implement a geospatial workflow over multiple turns of a human-to-computer dialog. FIG. 3B depicts an example of how the user of FIG. 3A may request additional geospatial processing. In FIG. 3B, the user has issued a subsequent natural language request, "Now add the sewer pipes on the south side of Deer Park Avenue." This may cause the processing depicted in FIG. 2 to begin again, except this time, tokens and/or other data generated during the previous iteration (i.e. the dialog turn that lead to the annotations 372 being added to map 370 in FIG. 3A) may also be incorporated into various LLM input prompts, in addition to additional data indicative of the user's subsequent natural language request.

In the example of FIG. 3B, the same responsive dataset(s) (municipal maps of sewer lines) that were used in FIG. 3A likely contained the additional information (sewer pipes on the south side of Deer Park Avenue) needed to fulfill the subsequent natural language request. However, other subsequent requests might cause additional responsive dataset(s) to be identified if they seek or rely on geospatial data that is not contained in the responsive dataset(s) used thus far. For example, suppose the user issues yet another request, "Now plot only those sewer pipes that are made of PVC." It may be the case that the municipal map of sewer lines does not specify the materials used for sewer lines. However, information contained in the municipal map may be capable of being cross-referenced with another dataset—e.g., a database of sewer pipes in the entire city, including locations of the sewer pipes and the materials they are made of—to determine what the annotated pipes in FIG. 3A and/or FIG. 3B are made of. The ultimate result may be that only those sewer pipes made of PVC are annotated, or that the PVC pipes are annotated differently than the non-PVC pipes (e.g., different colors, dashed lines versus solid lines, etc.).

FIG. 4 depicts a flowchart illustrating an example method of practicing selected aspects of the present disclosure, in accordance with various implementations. For convenience, the operations of method 400 are described with reference to a system that performs the operations. This system may include one or more processors, memory, and/or other component(s) of computing device(s). Moreover, while operations of the method 400 are shown in a particular order, this is not meant to be limiting. One or more operations may be reordered, omitted, and/or added.

At block 402, the system, e.g., by way of input processing engine 140 and/or LLM engine 142, may process a natural language request (e.g., 260 in FIG. 2) based on one or more generative models, such as one or more LLMs, to generate workflow output tokens (e.g., 262 in FIG. 2) that identify high-level actions for completing a geospatial task conveyed in the natural language request. In some implementations, LLM engine 142 may use a workflow LLM that is specifically trained to generate workflows. In other implementations, LLM engine 142 may use a more general purpose LLM to process data indicative of the natural language request.

As noted previously, in some implementations, a workflow LLM may be conditioned to ground actions of a candidate workflow to a context of the user, e.g., so that only feasible workflow actions are proposed. Infeasible workflow actions, such as actions that can only be performed using dataset(s) that are unavailable to the particular use, may be discarded. To this end, a user's context may include, for instance, metadata about an ecosystem of datasets and/or application programming interfaces (APIs) that are at the user's disposal. This contextual data may be used to condition the workflow LLM, e.g., along with the natural language request. As a result, the workflow LLM may generate output tokens representing proposed workflows and constituent workflow actions that are appropriate both semantically and contextually.

At block 404, the system, e.g., by way of dataset processing engine 152, may process first data (e.g., workflow output tokens 262, or embeddings generated therefrom) indicative of the high-level actions for completing the geospatial task based on one or more of the LLMs, such as the same LLM as was applied in block 402, or separate generative models in dataset LLM(s) database 154, including a dataset LLM and/or VLM. Based on this processing, dataset processing engine 152 may generate dataset output tokens (e.g., 264 in FIG. 2) that identify one or more responsive datasets that likely contain data responsive to the geospatial task conveyed in the natural language request.

At block 406, the system, e.g., by way of DM processing engine 156, may process second data indicative of both the high-level actions for completing the geospatial task and the one or more responsive datasets (e.g., 262 and 264) based on one or more of the LLMs (e.g., from database 158) to generate data manipulation output tokens (e.g., 266) that identify data manipulation instructions for assembling data from the one or more responsive datasets into a response that fulfills the geospatial task. In some implementations, the data manipulation output tokens (e.g., 266) may be source code tokens that collectively form source code that is executable to carry out the geospatial task.

At block 408, the system, e.g., by way of DM processing engine 156, may evaluate the data manipulation instructions identified from the data manipulation output tokens based on various criteria. If the data manipulation instructions are source code, in some implementations, the criteria may include whether the source code is able to successfully compile, or whether the source code is able to be parsed, includes correct syntax, etc. In other implementations, the criteria may include whether a result (e.g., 268) generated by executing the data manipulation instructions successfully fulfills the natural language request (e.g., 260) of the user.

At block 410, if the criteria are not satisfied, then in some implementations, at block 412, the system may cause the data manipulation instructions to be processed based on an error correcting LLM, e.g., to generate new data manipulation instructions that are compilable, error and/or bug free, etc. To this end, in some implementations, the error correction LLM may be trained on examples of source code that include errors and/or bugs and/or examples of source code that lack errors and/or bugs.

If the criteria are satisfied at block 410, then method 400 may proceed to block 414. At block 414, the system, e.g., by way of DM processing engine 156, may cause the data manipulation instructions to be executed using the responsive dataset(s) to generate the response (e.g., 268) that fulfills the geospatial task. At block 416, the system may cause the response that fulfills the geospatial task to be rendered at one or more computing devices, such as at client device 110 via rendering engine 112.

As shown by the arrow at left in FIG. 4, in some implementations, various data generated during the operations of blocks 402-416, such as various output tokens 262, 264, 266, response 268, natural language request 260, etc., may be passed back to LLM engine 142, which may process a new natural language request (e.g., the follow-up request issued in FIG. 3B) that seeks to modify or augment the original geospatial task. In this way, and as described previously, the system may provide a multiturn chatbot interface for iteratively and recursively developing increasingly complex and/or detailed geospatial tasks.

Figure 5:
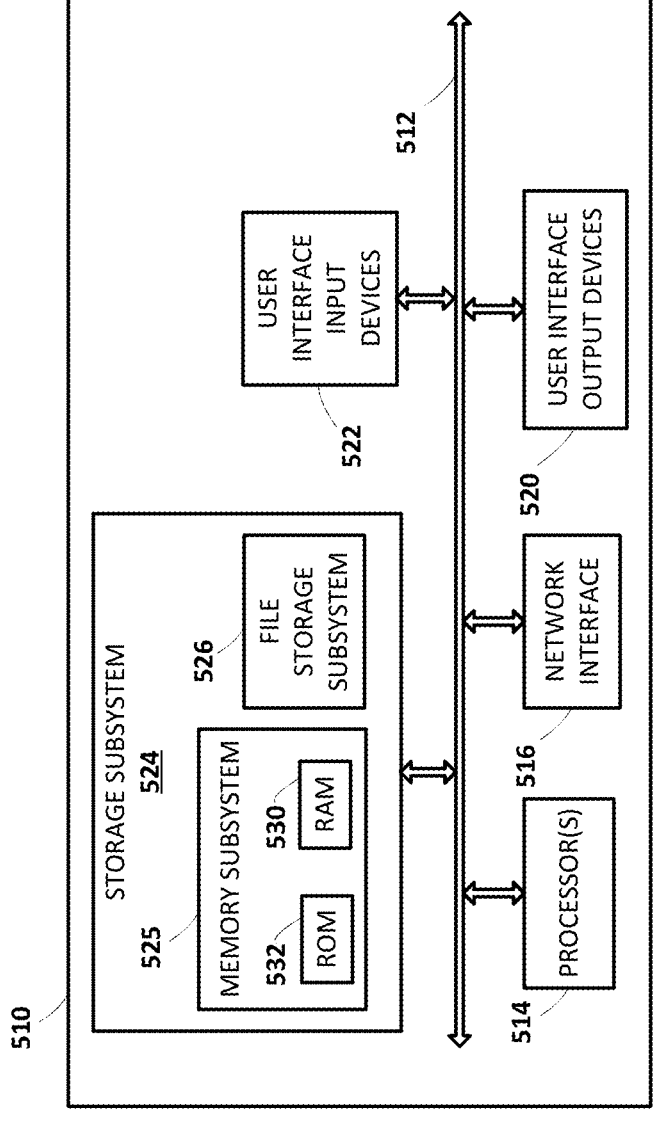
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s) or other cloud-based software application component(s), and/or or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1 or 2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

processing a natural language request based on one or more generative models to generate workflow output tokens that identify high-level actions for completing a geospatial task conveyed in the natural language request;

processing first data indicative of the high-level actions for completing the geospatial task based on one or more of the generative models to generate dataset output tokens that identify one or more responsive datasets that likely contain data responsive to the geospatial task conveyed in the natural language request;

processing second data indicative of both the high-level actions for completing the geospatial task and the one or more responsive datasets based on one or more of the generative models to generate data manipulation output tokens that identify data manipulation instructions for extracting data from the one or more responsive datasets for assembly into a response that fulfills the geospatial task, wherein the data manipulation instructions comprise:

structured query language (SQL) instructions; or source code composed in a high-level programming language;

causing the data manipulation instructions to be executed using the one or more responsive datasets to extract data from one or more of the responsive datasets for assembly into the response that fulfills the geospatial task; and causing the response that fulfills the geospatial task to be rendered at one or more computing devices.

2. The method of claim 1, wherein the natural language request is processed based on a different generative model than the first data.

3. The method of claim 1, wherein the natural language request is processed based on a different generative model than the second data.

4. The method of claim 1, wherein the first data is processed based on a different generative model than the second data.

5. The method of claim 1, wherein the first data further comprises metadata about a plurality of candidate datasets from which the one or more responsive datasets are identified.

6. The method of claim 5, wherein the metadata includes human-curated content describing one or more of the candidate datasets or data indicative of a database schema of one or more of the candidate datasets.

7. The method of claim 1, wherein the dataset output tokens indicate, for a plurality of candidate datasets from which the one or more responsive datasets are identified, respective measures of usefulness for performing the high-level actions for completing the geospatial task conveyed in the natural language request.

8. The method of claim 1, wherein the one or more responsive datasets include a first overhead digital depiction of a geographic area that includes annotations identifying land-based features of the geographic area.

9. The method of claim 8, wherein the first overhead digital depiction comprises a raster image.

10. The method of claim 9, wherein the raster image is captured by a satellite or a drone.

11. The method of claim 8, wherein the first overhead digital depiction comprises a vector-based map of the geographic area.

12. The method of claim 8, wherein the one or more responsive datasets comprises a second overhead digital depiction of at least part of the geographic area.

13. The method of claim 12, wherein the data manipulation instructions comprise:

instructions to join the first and second overhead digital depictions; or instructions to overlay one of the first and second overhead digital depictions in relation to the other.

14. The method of claim 1, wherein the one or more responsive datasets comprise at least first and second responsive databases, and wherein the data manipulation instructions comprise instructions to join data from the first and second responsive databases.

15. The method of claim 1, wherein one or more of the generative models comprises a large language model (LLM).

16. A method implemented using one or more processors and comprising:

processing a natural language request based on one or more generative models to generate workflow output tokens that identify high-level actions for completing a geospatial task conveyed in the natural language request;

processing first data indicative of the high-level actions for completing the geospatial task based on one or more of the generative models to generate dataset output tokens that identify one or more responsive datasets that likely contain data responsive to the geospatial task conveyed in the natural language request;

processing second data indicative of both the high-level actions for completing the geospatial task and the one or more responsive datasets based on one or more of the generative models to generate data manipulation output tokens that identify data manipulation instructions for assembling data from the one or more responsive datasets into a response that fulfills the geospatial task;

causing the data manipulation instructions to be executed using the one or more responsive datasets to generate the response that fulfills the geospatial task;

causing the response that fulfills the geospatial task to be rendered at one or more computing devices;

evaluating the data manipulation instructions based on one or more criteria;

based on a determination that the data manipulation instructions fail to satisfy one or more of the criteria, assembling an input prompt for one or more of the generative models, wherein the input prompt comprises at least some of the data manipulation instructions and additional information about the determination that the data manipulation instructions fail to satisfy one or more of the criteria; and processing the input prompt using one or more of the generative models to generate new data manipulation instructions.

17. The method of claim 16, wherein the data manipulation instructions comprise source code in a high-level programming language, and the one or more criteria include a capability of compiling the source code without error.

18. A system comprising one or more processors and memory storing instructions that, in response to execution by the one or more processors, cause the one or more processors to:

process a natural language request based on one or more generative models to generate workflow output tokens that identify high-level actions for completing a geospatial task conveyed in the natural language request;

process first data indicative of the high-level actions for completing the geospatial task based on one or more of the generative models to generate dataset output tokens that identify one or more responsive datasets that likely contain data responsive to the geospatial task conveyed in the natural language request;

process second data indicative of both the high-level actions for completing the geospatial task and the one or more responsive datasets based on one or more of the generative models to generate data manipulation output tokens that identify data manipulation instructions for extracting data from the one or more responsive datasets for assembly into a response that fulfills the geospatial task, wherein the data manipulation instructions comprise:

structured query language (SQL) instructions; or source code composed in a high-level programming language;

cause the data manipulation instructions to be executed using the one or more responsive datasets to extract data from one or more of the responsive datasets for assembly into the response that fulfills the geospatial task; and cause the response that fulfills the geospatial task to be rendered at one or more computing devices.

\* \* \* \* \*